Sept. 10, 1963    A. M. MOEN    3,103,231
BALANCED MIXING VALVE CARTRIDGE
Filed Feb. 3, 1960    5 Sheets-Sheet 1
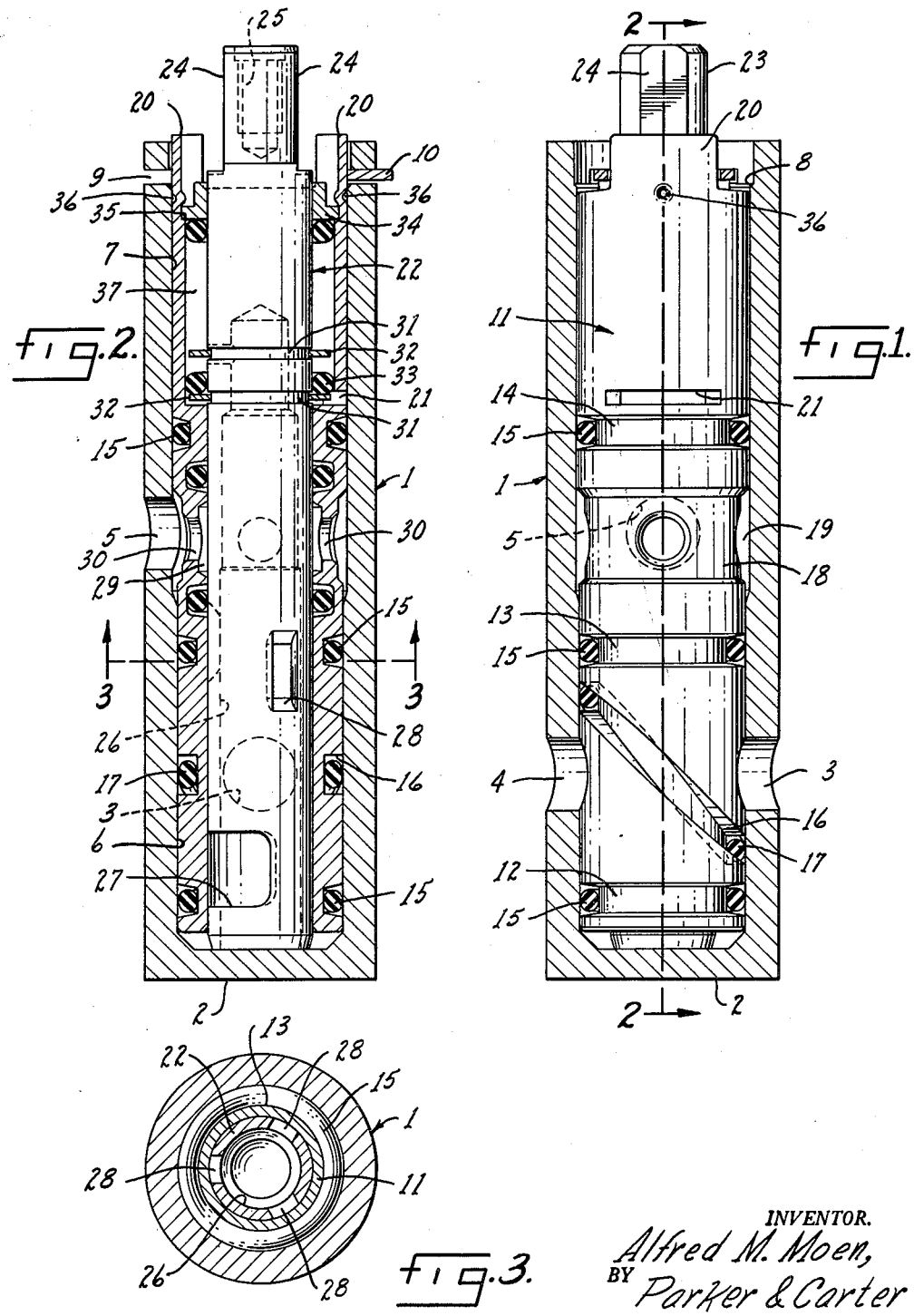
INVENTOR.
Alfred M. Moen,
BY Parker & Carter
Attorneys.

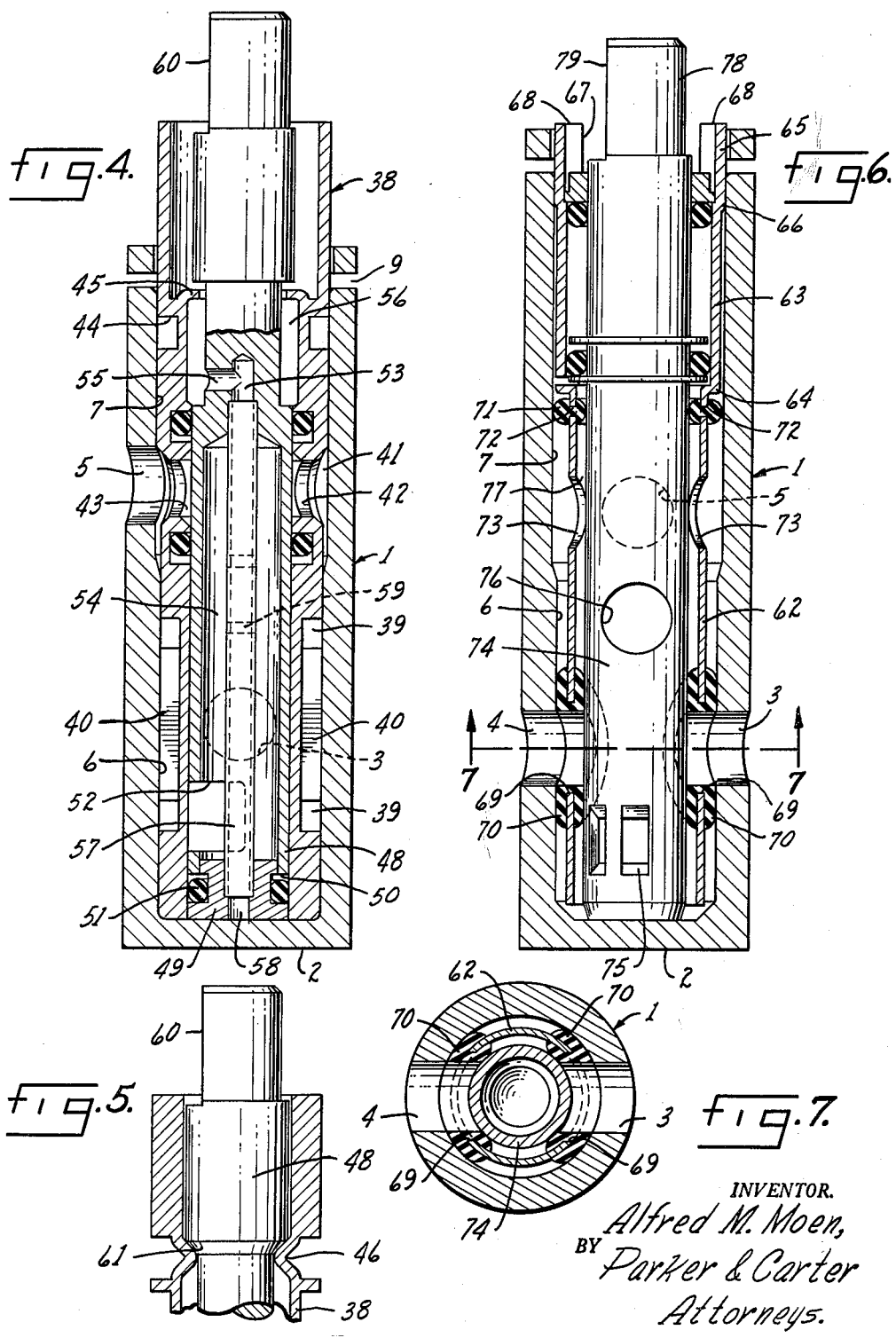

Sept. 10, 1963          A. M. MOEN          3,103,231
BALANCED MIXING VALVE CARTRIDGE
Filed Feb. 3, 1960          5 Sheets-Sheet 3
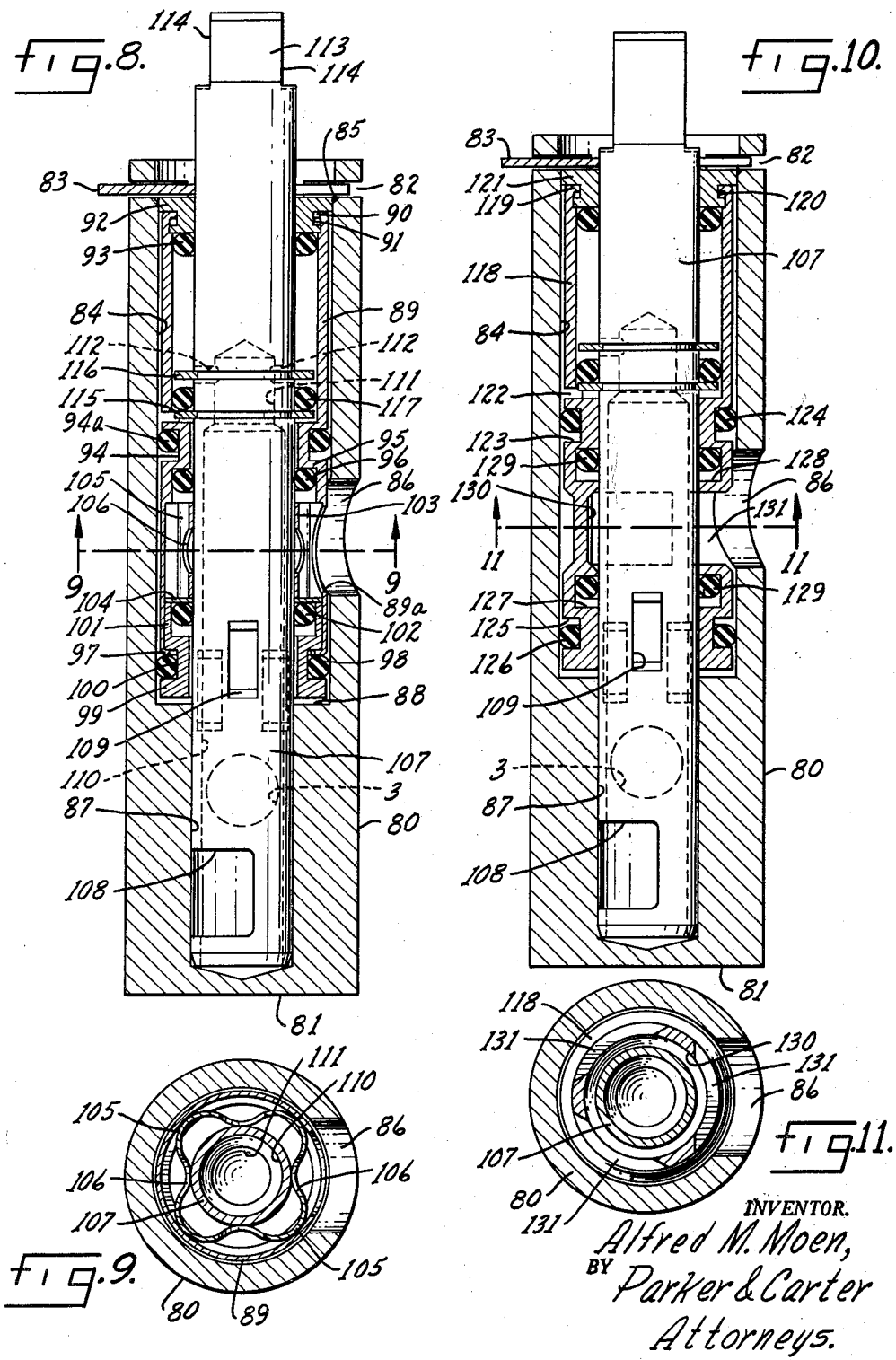
INVENTOR.
Alfred M. Moen,
BY Parker & Carter
Attorneys.

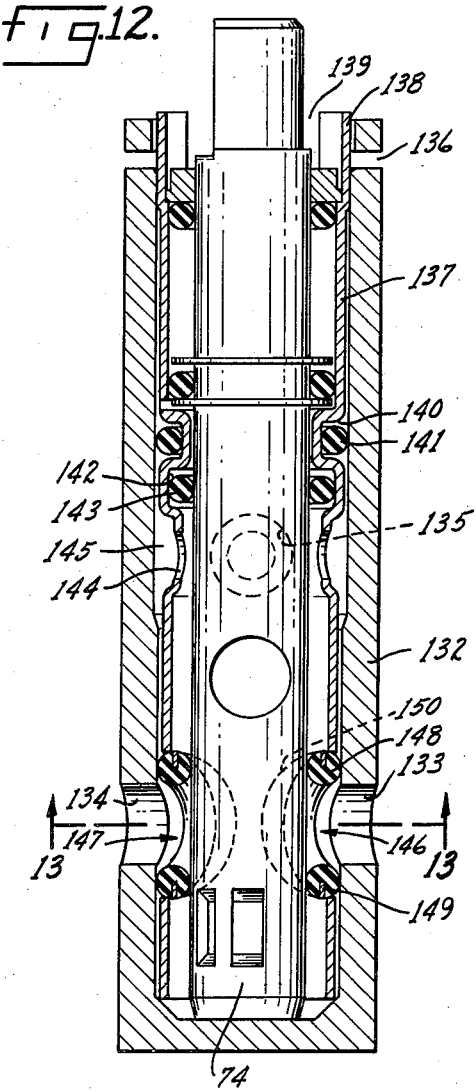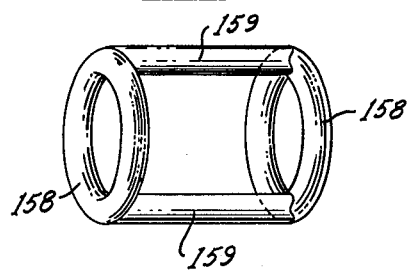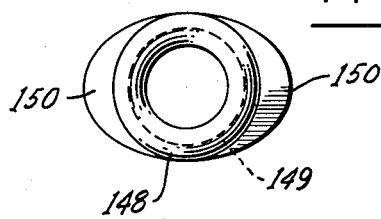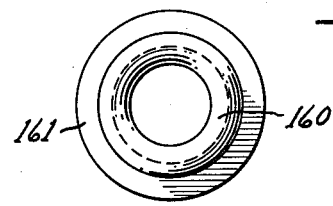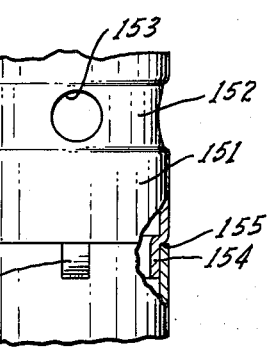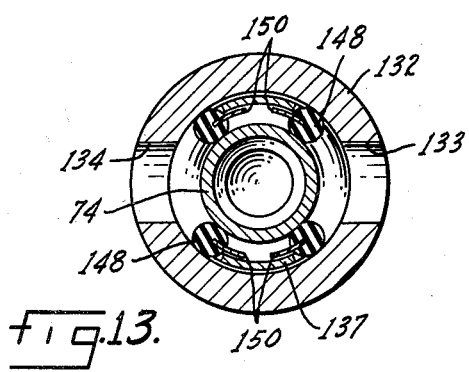

Sept. 10, 1963 A. M. MOEN 3,103,231
BALANCED MIXING VALVE CARTRIDGE
Filed Feb. 3, 1960 5 Sheets-Sheet 5

INVENTOR.
Alfred M. Moen,
BY Parker & Carter
Attorneys.

United States Patent Office

3,103,231
Patented Sept. 10, 1963

**3,103,231
BALANCED MIXING VALVE CARTRIDGE**
Alfred M. Moen, 151 Lakeview Drive, R.D. 1,
Grafton, Ohio
Filed Feb. 3, 1960, Ser. No. 6,452
7 Claims. (Cl. 137—454.2)

This invention relates to a valve or fluid control means. It has for one object to provide a unitary cartridge-like member which includes within itself relatively movable parts and which as a unit may be put into place in a housing and removed therefrom when repair is required so that it may be discarded and a new cartridge-like member inserted in its place.

An object of the invention is therefore to provide a disposable cartridge-like member for unitary insertion in, use within, and removal from a housing.

Another object is to provide a mixing valve assembly into which a plurality of fluids is introduced from different directions and within which fluids are mixed and discharged if desired in a chosen proportion of mixture.

Another object is to provide a cartridge-like valve assembly which within itself includes the movable parts of a mixing valve, the movable parts being effective to open or close a discharge passage through the valve assembly and to mix fluids of different kinds or qualities as desired.

Another object is to provide a mixing valve of the types indicated above which will be fully pressure-balanced at all times whether the valve is open for discharge or closed against discharge.

Other objects will appear from time to time throughout the specification and claims.

The invention is illustrated more or less diagrammatically in the accompanying drawings wherein:

FIG. 1 is a longitudinal section through one form of the device, the housing being shown in section and the cartridge assembly being shown in elevation;

FIG. 2 is a section taken at line 2—2 of FIG. 1 showing the sleeve of the cartridge in section and the stem in elevation;

FIG. 3 is a transverse section taken at line 3—3 of FIG. 2;

FIG. 4 is a view generally similar to FIG. 2 but showing a modified form;

FIG. 5 is a sectional detail showing a modified form as securing the stem of FIG. 4 in place;

FIG. 6 is a view generally similar to FIGS. 2 and 4 and showing a further modification;

FIG. 7 is a transverse section taken at line 7—7 of FIG. 6;

FIG. 8 is a longitudinal section through a still further modified form of the device;

FIG. 9 is a transverse section taken at line 9—9 of FIG. 8;

FIG. 10 is a longitudinal section with parts in elevation showing a still further modification;

FIG. 11 is a transverse section taken at line 11—11 of FIG. 10;

FIG. 12 is a longitudinal section through a still further modified form of the device;

FIG. 13 is a transverse section taken at line 13—13 of FIG. 12;

FIG. 14 is a detail in a flat state of the inlet and outlet sealing means as used in the form of the invention shown in FIG. 12;

FIG. 15 is a detail view of a modified seal shown in its flat state;

FIG. 16 is a partial longitudinal view, with parts in section, showing a modified form of assembling the cartridge sleeve;

FIG. 17 is a detail of a seal as used in the form of the invention as shown in FIG. 4.

Figure 18:
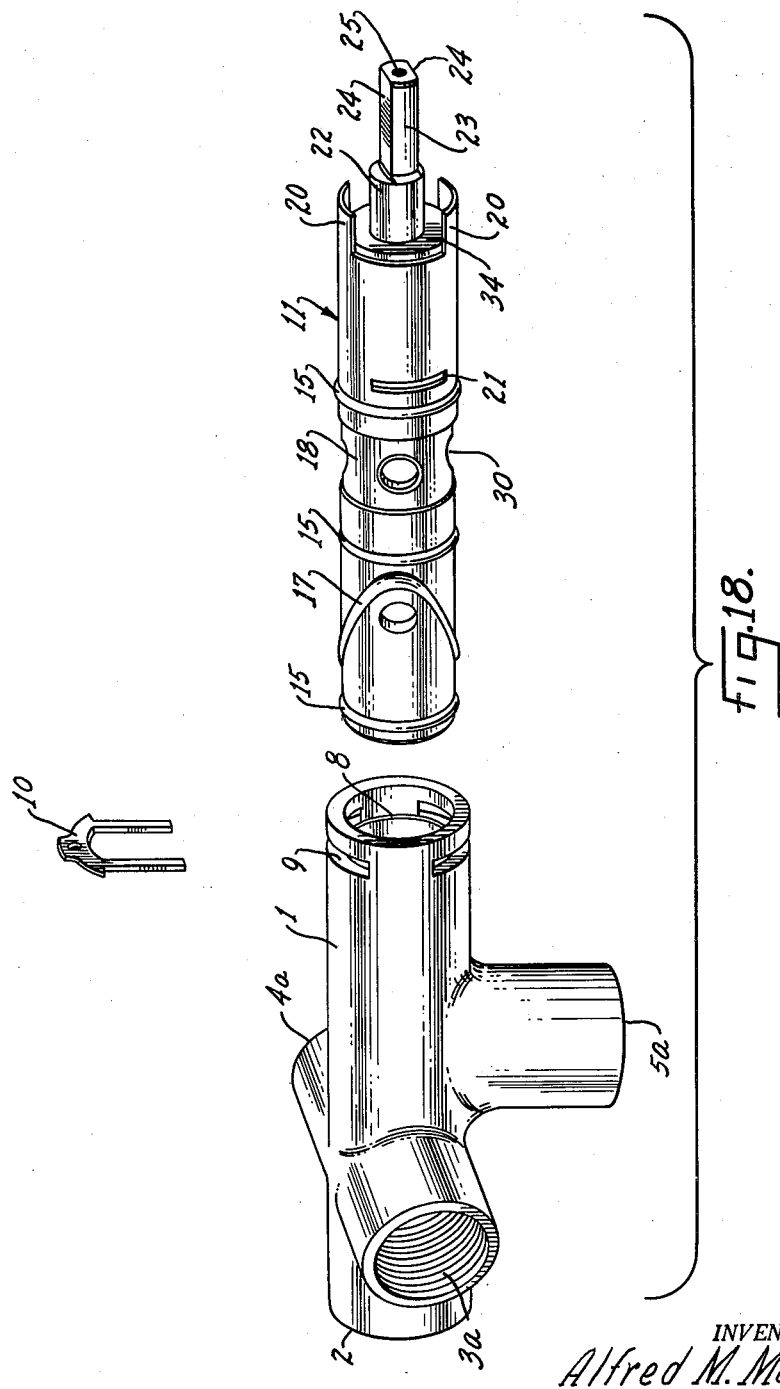
FIG. 18 is an exploded view showing the cartridge before insertion in the housing.

The invention comprises a housing member such as the member 1 which is fixed in relation to the plumbing connections, such as the water inlet pipes. It is therefore in effect a relatively permanent part of the water supply system of a building. The water supply connections may be engaged with the threaded extensions 3a and 4a of FIG. 18 or they may be connected to the openings 3 and 4 of FIG. 1, for example. These are the water inlet openings and water supply pipes may be connected to them by threaded engagement, by being welded in place or otherwise secured to the housing 1. Whatever the precise details may be, the housing 1 or its equivalent member is permanently secured in the plumbing system and particularly in the water supply system. A spout or outlet connection is engaged with the outlet opening 5 of FIG. 2. It may be fastened to that connection in any fashion convenient to carry out the discharge of water from the opening 5. In the form of FIG. 18 a member 5a is integral with the housing 1. When the member 5a is present the discharge spout will be secured to that member.

In all of the forms there is thus a fixed housing member secured to the water supply system and to the water discharge connection and since this housing member is mounted permanently in the system it would be inconvenient and costly to remove it after wear has occurred. Therefore it is one of the objects of the invention to provide a valve construction for faucets in which the permanent housing member 1 is not subject to the general wear to which the moving parts of the faucet are subject. To accomplish this each form of the invention comprises, in addition to the fixed and relatively permanent housing 1, a sleeve within which a valve stem may be rotated and reciprocated. The sleeve itself once it has been put into position within the fixed housing does not move and therefore neither the sleeve nor any other part of the valve mechanism moves in contact with the housing, and thus the housing is not subject to wear during valve operation. Should the valve assembly require repair or renewal, the entire cartridge is withdrawn as a unit. The sleeve and the stem are thus withdrawn as a unit and a new properly functioning cartridge is reinserted. The only movement against the housing which occurs is when the cartridge is first inserted and when it is finally removed for replacement. The structure of the invention as disclosed, therefore, comprises means which avoids wear upon any fixed or relatively permanent part of the water supply and water discharge system. In particular it provides means for protecting the housing, such as the housing 1, from wear incident to valve operation. The only wear which occurs as a result of valve operation is that between the valve stem and the sleeve within which it is positioned and the sealing parts of the sleeve or valve stem.

Like parts are designated by like characters throughout the specification and drawings.

In the form shown in FIGS. 1 and 2, 1 is a housing having a closed end 2 and a plurality of inlet ports 3 and 4. It is provided with one or more outlet ports 5 and it may be formed internally with two diameters; thus the portion 6 is of less diameter than the portion 7. At its open end the housing 1 may be tapered as at 8. It may also be provided with a keyway slot 9 to receive a key 10 to hold the cartridge or valve assembly in position within the housing.

In the form shown in FIGS. 1 and 2 the cartridge or valve assembly includes a sleeve designated generally by the numeral 11. This is a hollow member provided on its exterior with three grooves 12, 13 and 14 to receive O-rings 15 which appear in each of the grooves. Since the O-rings are normally identical, they are designated by the same reference numeral. Intermediate the grooves 12 and 13 an inclined groove 16 is formed and an O-ring 17 is positioned within it. The sleeve 11 is provided with an external groove 18. The purpose of the groove is primarily to provide an annular clearance space 19 about the sleeve and between it and the inner face of the housing 1 so that fluid may pass about the valve cartridge and reach the discharge outlet 5 for discharge. The sleeve 11 may be cut away at its outer end to provide ears 20. The sleeve 11 is also slotted or provided with an opening 21 to provide for the escape of air in a manner to be described below.

Within the sleeve 11 a valve stem 22 is mounted for rotation and reciprocation. It is preferably provided at one end with a reduced portion 23 which may be flattened as at 24, 24 and it may be provided with a threaded cavity 25. The exposed end of the stem receives a handle which is correspondingly shaped to fit against the flat portions and is held in place by a screw, not shown. The details of the handle form no essential part of the invention. It is sufficient for the purposes of the invention that a handle be provided so that the valve stem may be rotated and reciprocated. The stem in the form shown in FIG. 2 is hollow, as indicated at 26, and this hollow may extend to the inner end of the stem. The stem adjacent its inner end is cut away as at 27 to provide an inlet port through which fluid may reach the interior of the stem when the cutaway portion is in alignment with one or both of the inlet ports 3 and 4.

The stem is provided intermediate its ends with one or more slots or openings 28 through which fluid may be discharged from within the stem when the opening or openings are in alignment with an internal groove 29 formed within the sleeve 11. The internal groove is in communication with one or more outlet ports 30 formed in the sleeve and also in communication with the one or more outlet ports 5 in the housing. If desired grooves may be formed on the interior of the sleeve 11 on opposite sides of the internal groove 29. These added grooves, if present, may contain O-rings.

The stem 22 is also provided with a pair of external grooves 31 within each of which is positioned snap rings 32, 32 and an O-ring 33 is positioned between the rings 32. 34 is a lock ring which fits against a shoulder 35 and is staked against displacement from the sleeve 11 as at 36 in FIG. 1. A fluid chamber 37 is thus provided about the stem and within the sleeve. This fluid chamber extends from the snap rings to the ring 34. The snap rings are not in contact with the interior of the sleeve.

In the modified form of FIGS. 4 and 6 the housing may be substantially the same as that shown in FIGS. 1 and 2 and it will not be redescribed. The same reference numerals are applied, therefore, to the housing of FIGS. 4 and 6 as those applied to the housing of FIGS. 1 and 2. Since the cartridge construction differs, it will be described separately.

In the form of FIG. 4 the cartridge includes a sleeve 38. It is provided with a pair of annular grooves 39, 39 formed in its exterior and longitudinal slots 40, 40 are formed to communicate with the grooves 39. A pair of O-rings are positioned in the slots 39 and are joined together by longitudinal portions which lie within the grooves 40. The sleeve 38 is provided with an external groove 41 and with one or more outlet ports 42. The sleeve is also grooved internally as at 43 and the outlet ports 42 thus communicate with each of the grooves 41 and 43. Adjacent its outer end the sleeve 38 is provided with a groove 44 which may receive an O-ring. The sleeve is provided with an integral internal flange 45 which projects inwardly, as shown, and limits the reciprocation of the stem.

FIG. 5 illustrates a modified form of stop or limit for the reciprocation of the stem. As shown, the sleeve 38 is provided with an inwardly directed member 46 of angular cross section and it acts as a stop to limit reciprocation of the stem.

The stem as shown in FIG. 4 includes a generally tubular member 48 which is hollow throughout a substantial portion of its length. At its inner end it is closed by a collarlike member 49 which is grooved as at 50 to contain an O-ring 51. The stem is cut away as at 52. The cutaway portion 52 acts as an inlet port when it is in register with one of the inlet ports 3 or 4, or both of them. The stem is provided with an air passage of reduced diameter 53 which is sealed from the main fluid passage or chamber 54 formed within the stem, and a lateral passage 55 communicates with the reduced passage 54 and extends to the exterior of the stem into an annular space or chamber 56 between the stem and the sleeve. Positioned within the stem is a tube 57 which is seated at one end in the collar 49 and at the other end is seated in the valve stem and is in communication with the passage 53. The opening 58 in the collar 49, the tube 57 and the passages 53 and 55 provide an air passage from the inner end of the stem throughout the major part of the length of the stem, which passage leads to the exterior of the stem. The stem itself is also slotted as indicated at 59. There will normally be three of such slots but the number is not critical. They are similar in shape and function to the slots 28 shown in FIG. 2.

The stem is preferably provided with a flattened portion 60 to receive a handle member which will be shaped correspondingly so that it may be secured to the end of the stem and used to accomplish reciprocation and rotation.

In the modified form of FIG. 5 the sleeve and stem are the same as those shown in FIG. 4 except that the inwardly formed member 46 is provided to act as a stop instead of the flange 45 of FIG. 4. The stem 48 is, in the modification of FIG. 5, provided with an inclined face 61 which corresponds in shape to that portion of the member 46 with which it can come in contact.

In the modified form of FIG. 6 the sleeve may be formed of lighter material than that of which the sleeves in the earlier forms are shown. It might be of metal or plastic or other suitable material. It will normally be of relatively thin section, as shown in the figure, and it will be formed to produce several diameters. There is thus what might be called the main diameter defined by the sleeve portion 62. There is a portion of enlarged diameter 63 and a shoulder 64 is thus formed between the portion 62 and 63. There is a further enlarged portion 65 which defines the outer end of the sleeve and a shoulder portion 66 is thus formed between the sections 63 and 65. Thus, by the portions 64 and 66 external and internal shoulders are formed on the sleeve. The portion 65 may be cut away as at 67 to provide, in effect, two ears 68 at the outer end of the sleeve of FIG. 6. The sleeve is preferably provided with two perforations 69, 69, each of which is surrounded by a packing or sealing member 70, 70 which is in contact with the housing and with the stem. The packing member 70 may be of rubber or rubberlike material or any suitable packing and sealing material and it is preferably bonded to the material of which the sleeve is formed. A smaller ring or sealing or packing member 71 is positioned about the sleeve adjacent the shoulder 64. As shown, the sleeve may be perforated as at 72, 72 to permit portions of the ring or packing member 71 to penetrate through the sleeve and thus to be secured to the sleeve additional to the bonding which is preferably carried out. The sleeve is provided with one or more outlet holes or openings 73.

Positioned for rotation and reciprocation within the sleeve 62 is a stem 74. It is hollow throughout a substantial portion of its length and adjacent its inner end it is provided with one or more openings or cutaway portions 75. These serve as inlet ports or passages by means of which fluid may reach the interior of the valve stem 74 when the openings 75 are in register with one or another of the housing inlet ports 3, 4. There will be a sufficient number of openings 75, or if only a single opening is formed it will be of sufficient extent to permit register with both inlet ports 3 and 4 simultaneously. One or more openings or passages 76 is formed in the stem away from its ends and through these openings fluid may move from the stem to the annular space 77 between the stem and the sleeve and may move to the outlet passage 73 through the sleeve. Although none are shown in FIG. 6, one or more outlet passages will be provided through the wall of the housing 1 in the manner of the passage 5 shown in FIGS. 2 and 4. The stem 74 may be reduced in diameter, as at 78, and flattened as at 79 to receive a handle which will be correspondingly shaped and by means of which it may be rotated and reciprocated.

In the modified forms of FIGS. 8 and 10 the housing differs from the housing 1 of the earlier figures. This difference is made possible or necessary because the sleeves of the forms of FIGS. 8 and 10 differ in length in relation to the housing. Thus in FIGS. 8 and 10 there is a housing 80 closed at 81 at one end, slotted at 82 to receive a key 83. The housing is provided with an internal cavity of two diameters. There is thus a portion 84 which may be beveled internally at its outer end as at 85. An outlet passage 86 is formed in the housing and within the section 84 of the major diameter. A second portion of the housing is shaped with a reduced diameter and is designated by the numeral 87. A shoulder 88 may be formed between the portions 84 and 86.

The forms of FIGS. 8 and 10 differ from the earlier forms in part in that the stem has direct contact with the housing throughout part of its length and is contained within the sleeve only through a part of its length. There is thus in FIG. 8 a sleeve 89 which is ported as at 89a and is provided at its outer end with an inturned flange 90 which engages a groove 91 in a collar 92 which closes the sleeve at its outer end and contacts the stem. An O-ring 93 may be positioned within the sleeve at this portion and it may contact the inner surface of the sleeve 89. The sleeve 89 is grooved as at 94 to receive an O-ring 94a. The groove forms internal and external shoulders which are in part defined by the portion 95 of the sleeve. An O-ring 96 may be positioned within the sleeve and may bear against the shoulder 95 at times. The sleeve 89 extends downwardly and terminates at an inwardly bent flange 97 which engages a shoulder 98 formed in a collar member 99 which is grooved exteriorly as at 100. A portion 101 of the collar 99 fits within the sleeve 89. Within the portion 101 of the collar 99 an O-ring 102 may be positioned.

A spacing sleeve member 103 is positioned about the stem and cooperates with a washer 104 against which the O-ring 102 may move. The spacing member 103 is provided with outwardly grooved portions 105, as shown particularly in FIG. 9. It is also provided with a plurality of outlet openings 106.

The valve stem in the form of the device shown in FIGS. 8 and 10 is substantially identical and it will be described but once. There is thus in these forms of the invention a valve stem 107 which is provided with a cavity extending a substantial portion of its length. It is cut away at 108 to provide entrance for fluid into the hollow interior of the stem when the opening 108 is in register with one or another of the inlet passages 3 or 4, or with both of them. Several, preferably 3, cuts or openings 109 are formed in the valve stem and they may register with the outlet passage 86. The cavity or passage 110 formed within the stem may be reduced as at 111 and one or more relatively small passages 112 are formed extending from the portion 111 to the outside of the valve stem. The valve stem is preferably reduced at its outer end, as at 113 and flattened as at 114 to receive a handle by means of which it may be reciprocated and rotated.

Positioned in suitable grooves formed in the valve stem are snap rings 115 and 116. Between them in the form of FIG. 8 is positioned an O-ring 117.

As above mentioned, the housing 84 is substantially the same in FIGS. 8 and 10; so also, as mentioned, is the valve stem. Neither the housing nor the stem will be redescribed in connection with FIG. 10. The sleeve of the valve cartridge of the form shown in FIG. 10 will now be described. This sleeve differs from the sleeve shown in the form of FIG. 8 in that it is substantially unitary from end to end. There is thus shown in FIG. 10 a sleeve 118 which is inwardly bent adjacent its outer end as at 119 to seat within a groove 120 formed in a collar 121 which engages the housing 80 and closes the sleeve. The collar 121 is in contact with the stem 107. The sleeve is perforated or provided with an opening of any suitable shape, which is shown at 122. This opening extends from the interior of the sleeve to the exterior. The sleeve 118 is grooved as at 123 and the groove contains an O-ring 124. The sleeve is additionally grooved externally adjacent its inner end as at 125 and contains an O-ring 126. The sleeve 118 is provided with two internal grooves 127 and 128 within each of which is positioned an O-ring 129. The sleeve is provided with an internal groove 130 which is generally opposite or in register with the outlet passage 86 through the housing 80. The exterior of the sleeve 118 is cut to provide three cuts 131, each of which extends throughout approximately 120 degrees of the external diameter of the sleeve.

In the further modification of FIG. 12 a form of sleeve similar to that shown in FIG. 6, but not identical with it, appears. In the form of FIG. 12 the sleeve is continuous from end to end of the valve assembly. It is preferably formed of relatively light material and is shaped to the desired contour and provided with the necessary perforations and cavities. It may be formed from a tubular member which is initially straight-sided, or approximately so, and it may be given a desired contour by any suitable mechanical steps.

The housing 132 is somewhat similar to the previous forms of housings illustrated but is not necessarily identical with them. It is provided with inlet openings 133 and 134, respectively, and with an outlet opening 135. As in the case of the earlier forms, inlet members, not shown, are connected in communication with the openings 133 and 134. Hot and cold water may be supplied through these openings. The mixed water is discharged through a suitable outlet pipe or connection, not shown, which is connected to the outlet opening 135.

Generally each of the housings shown comprises at least two inlet openings and at least one outlet opening. The housing 132 is provided with a keyway slot 136 which is generally similar to the keyway slot 9 shown in the earlier forms and is arranged to receive a key such as the key 10 or 83 which holds the valve cartridge assembly against displacement from the housing.

A sleeve member 137 is arranged to be positioned within the housing when desired. It is comparable to the other sleeve members shown in the earlier forms. It is arranged for insertion into the housing. It is ported. It is provided with necessary sealing means and it is arranged to receive within itself a valve stem which is to be reciprocated and rotated within the sleeve. The sleeve 137 is shaped to provide several different diameters. It has an enlarged portion 138 adjacent its outer end which preferably fits snugly within the housing 132, and it is provided with two notched or cutaway portions 139 to receive a key such as the key 10 or 83. The major diameter of the sleeve 137 is substantially uniform, as shown in FIG. 12, and is such that the sleeve is out of contact with the inner face of the housing. A groove 140 is formed in the sleeve and receives an O-ring 141. An internal groove 142 is formed in the sleeve and receives an O-ring 143. One or more openings 144 are formed in the sleeve. These are outlet openings and are positioned to communicate freely with the outlet opening 135 of the housing 132. An annular passage 145 is formed between the outer surface of the sleeve 137 and the inner surface of the housing 132. Thus free passage of liquid from within the sleeve 137 to the outlet opening 135 is provided.

The sleeve 137 is provided with inlet passages 146 and 147 which in the faucet assembly are positioned generally opposite to the inlet openings 133 and 134, respectively. Sealing means are preferably provided about each of the openings 146 and 147 and they are identical in construction. They comprise a ring 148 of generally O-ring shape and each ring has within it a washerlike member 149 which is of metal or equivalent material. The washer 149 has formed upon it preferably oppositely placed tabs 150, as shown in FIG. 14, by means of which the sealing member may be handled and will engage with the sleeve 137, the tabs fitting inside the sleeve as indicated in dotted lines in FIG. 12 when the sealing means of FIG. 14 are in place. This relationship is also illustrated in the cross section of FIG. 13.

A stem is provided within the sleeve 137 for rotation and reciprocation with respect to the sleeve. Since it is identical to the sleeve shown in FIG. 6 it will not be redescribed and the same reference numbers which appear on the stem in FIG. 6 are applied to the stem in FIG. 12.

As shown in FIG. 16 a modification of the sleeve 137 appears. In the modified form of this FIG. 16 the sleeve has the same shape and contour as that shown in FIG. 12 but is formed of two parts instead of a single tubular member. Thus as shown in FIG. 16 the sleeve comprises an upper or outer portion 151 which is shaped to provide a groove 152 with which one or more perforations 153 communicate. The sleeve portion 151 may be inwardly bent as at 154 and thus provides a shoulder 155.

A lower portion 156 is added to the sleeve and it overlaps the inwardly bent portion 154 of the sleeve 151, as shown in section in FIG. 16, and its movement in the telescoping direction is limited by the shoulder 155. One or more overlapping portions 157 may be formed on the sleeve section 151, if desired.

FIG. 17 illustrates in perspective the form of sealing device intended for use in connection with the structure of FIG. 4. In connection with the description of that figure, grooves 39 have been described as having connecting slots 40. Referring now to FIG. 17, the O-ring portions 158 lie within the grooves 39 and the longitudinal or connecting portions 159 lie within the longitudinal slots 40. Thus the two O-ring portions 158 are connected to each other by the longitudinal members 149 and they accomplish the outer sealing of the sleeve 38 in the housing 2.

Although an operative form of the device has been shown, the invention is not limited to the particular details shown. Many changes may be made in the form, shape and arrangement of parts without departing from the spirit of the invention. In particular, although the device has been described as a means for selectively mixing two fluids, such as hot and cold water, and discharging them together at the desired temperature and in the desired quantity, it may be used in a sense "in reverse." The valve cartridge and assembly may be used to discharge a single fluid selectively by volume through two independent discharges. Thus if this were done, the opening 5 of FIG. 2 would act as the inlet opening and the openings 3 and 4 would act as the outlet openings or ports. The operation of the faucet in this case would be to admit a single fluid in controlled volumes through the opening or passage 5 and to discharge it in two independent streams selectively by volume through the openings 3 and 4. If the faucet system were used thus to discharge a single fluid selectively by volume through the two independent discharges, the structure, so far as the valve cartridge is concerned, would be the same as that disclosed in the several forms illustrated herein. The operation of the valve stem and the handle which controls it would be the same except that the whole device would operate, so to speak, in "reverse."

I claim:

1. In combination in a valve cartridge, a valve sleeve member, a plurality of inlet ports and at least one common outlet port formed therein, a valve member positioned within said sleeve for reciprocation and rotation with respect thereto for selective control of said inlet and outlet ports, a valve stem connected to said valve, sealing means between the valve member and sleeve member, sealing means carried by the sleeve and disposed thereon with respect to said ports to preclude seepage of fluid from said ports along the external surfaces of the sleeve, said valve member being provided with a passage communicating with the inlet and outlet ports in an "on" position of the valve, a portion of said valve stem extending beyond said sleeve and shaped to receive an operating handle whereby it may be rotated and reciprocated, said valve member including oppositely directed pressure balancing surfaces subject to pressure within said passage whereby the pressure fluid within said cartridge is balanced to preclude resulting longitudinal movement of said valve member and stem with respect to the sleeve, said cartridge adapted to be inserted as a unit into a housing provided with a plurality of inlet ports and an outlet port.

2. The combination recited in claim 1 wherein vent means is provided for discharging air from the cartridge when the valve is moved longitudinally within the sleeve by a force applied to said valve stem.

3. The combination recited in claim 2 wherein said venting means includes an air duct extending through said longitudinal passage to opposite ends of the valve.

4. The combination recited in claim 1 wherein said second-mentioned sealing means includes circular sealing members spaced above and below the inlet and outlet ports respectively, and a diagonal sealing member surrounding the sleeve and disposed between the circular sealing means at opposite sides of the inlet ports.

5. The combination recited in claim 1 wherein said first and second mentioned sealing means are integrally formed into grommet-shaped sealing members having inlet port surrounding sealing portions.

6. The combination recited in claim 1 wherein said sleeve member is provided with positioning means adapted for cooperation with complemental features carried by the housing in which the cartridge is adapted to be inserted to insure proper registration of the ports in the sleeve and in the housing.

7. In combination in a valve cartridge, a valve sleeve member, a plurality of inlet ports and at least one common outlet port formed therein, a valve member positioned within said sleeve for reciprocation and rotation with respect thereto for selective control of said inlet and outlet ports, a valve stem connected to said valve, sealing means between the valve member and sleeve member, sealing means carried by the sleeve and disposed thereon with respect to said ports to preclude seepage of fluid from said ports along the external surfaces of the sleeve, said valve member being provided with a passage communicating with the inlet and outlet ports in an "on" position of the valve, a portion of said valve stem extending beyond said sleeve and shaped to receive an operating handle whereby it may be rotated and reciprocated, said cartridge adapted to be inserted as a unit into a housing provided with a plurality of inlet ports and an outlet port.

References Cited in the file of this patent

UNITED STATES PATENTS

| | | |
|---|---|---|
| 1,602,118 | Mortimer | Oct. 5, 1926 |
| 1,693,758 | Hennessey | Dec. 4, 1928 |
| 1,943,865 | Hennessey | Jan. 16, 1934 |
| 2,202,216 | Madsen | May 28, 1940 |
| 2,373,702 | Moen | Apr. 17, 1945 |
| 2,800,923 | Russell | July 30, 1957 |
| 2,940,465 | Frantz | June 14, 1960 |
| 2,980,132 | Pryatel | Apr. 28, 1961 |
| 2,987,070 | Fraser | June 6, 1961 |
| 2,995,337 | Tanner | Aug. 8, 1961 |
| 3,000,393 | Maynard | Sept. 19, 1961 |